H. G. BAUMAN.
ATTACHMENT FOR CAMERAS.
APPLICATION FILED APR. 30, 1909.
961,425.
Patented June 14, 1910.
2 SHEETS—SHEET 1.
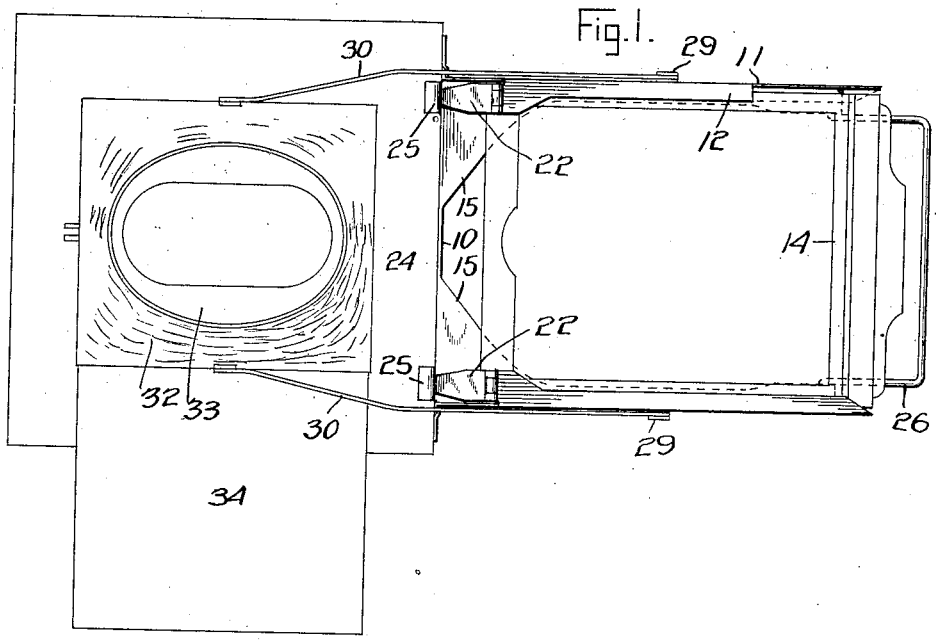
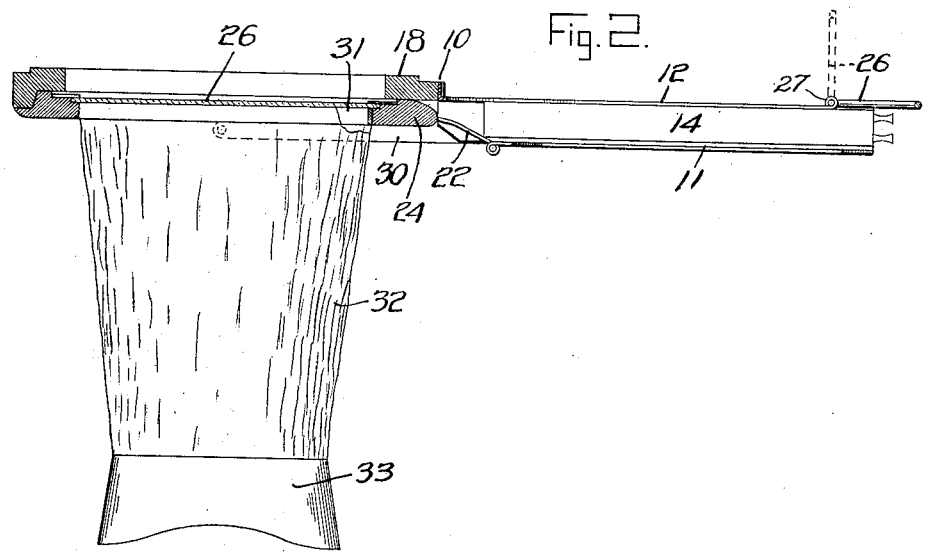
Witnesses
C. K. Reichenbach
M. E. Lowry
Inventor
Henry G. Bauman
By H. C. Evert & Co.
Attorneys H. G. BAUMAN.
ATTACHMENT FOR CAMERAS.
APPLICATION FILED APR. 30, 1909.
961,425.
Patented June 14, 1910.
2 SHEETS—SHEET 2.
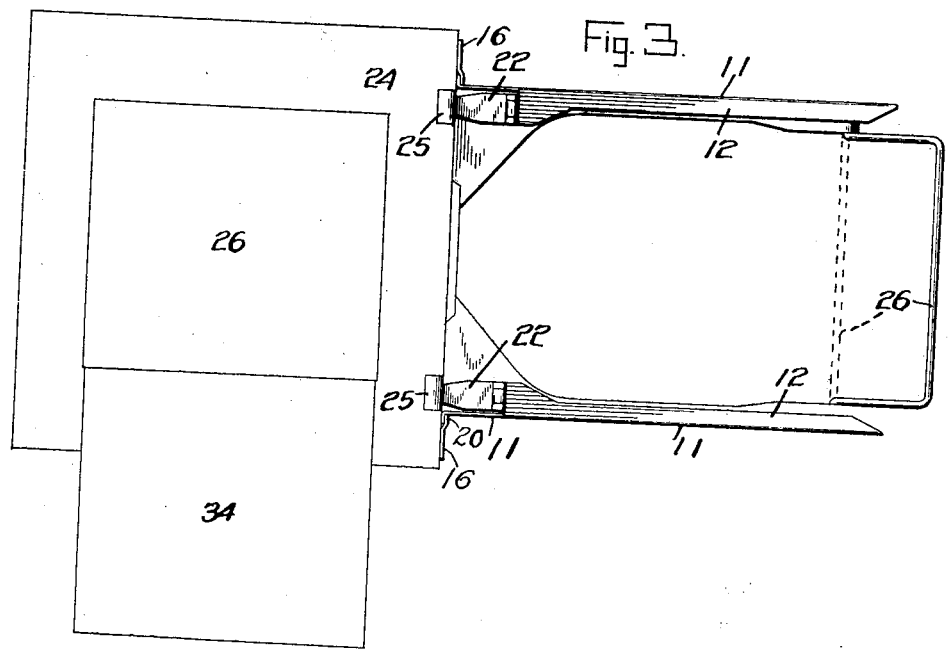
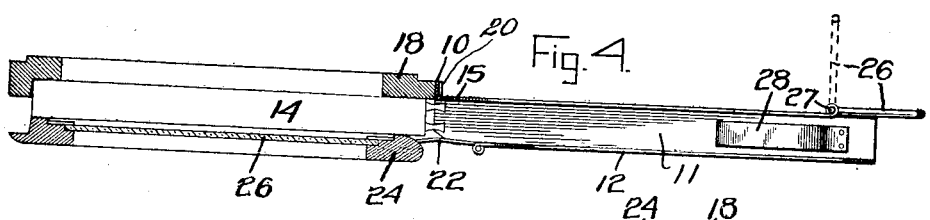
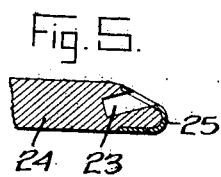
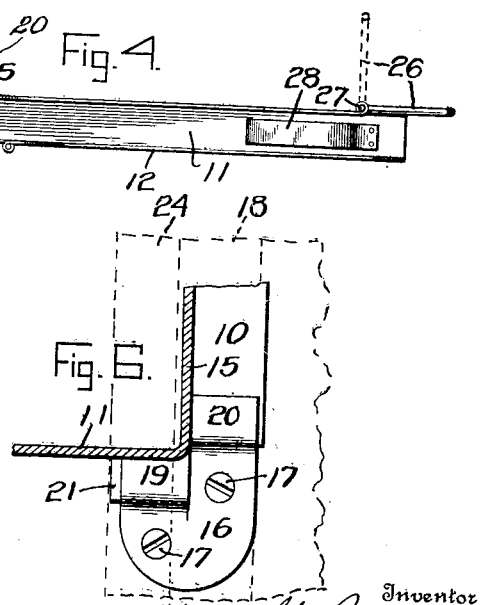
Witnesses
C. H. Reichenbach
M. E. Lowry
Inventor
Henry G. Bauman
By H. C. Everett
Attorneys

UNITED STATES PATENT OFFICE.

HENRY G. BAUMAN, OF INDIANA HARBOR, INDIANA.

ATTACHMENT FOR CAMERAS.

961,425.   Specification of Letters Patent.   Patented June 14, 1910.

Application filed April 30, 1909. Serial No. 493,130.

*To all whom it may concern:*

Be it known that I, HENRY G. BAUMAN, a citizen of the United States of America, residing at Indiana Harbor, in the county of Lake and State of Indiana, have invented certain new and useful Improvements in Attachments for Cameras, of which the following is a specification, reference being had therein to the accompanying drawing.

This invention relates to certain new and useful improvements in camera attachments, and the invention has for its main object the provision of means whereby the plate can be easily and rapidly positioned in the camera after the focus has been properly taken on the ground glass.

Another object of the invention is to provide a plate holding device which may readily be attached to and detached from the camera, and which, when in position on the camera will not interfere in any manner with the operator when focusing the camera, or other manipulation thereof.

A further object of the invention is to provide a plate holding attachment for cameras, which, when detached from the camera will occupy comparatively little space, so that the same may be readily carried in the plate-holding case.

A still further object is to provide a plate-holding device adapted to be attached to the camera in such a manner as to support the plate in proper position to be forced into and positioned within the camera immediately upon the focus being obtained, whereby the time ordinarily consumed in the taking of pictures upon plates is reduced to a minimum.

Another object of the invention is to provide a plate-holding device for cameras with a focusing hood connected to the plate-holding attachment in such manner as to permit of the hood being moved into and out of position with respect to the ground glass of the camera as desired, and thus dispense with the necessity for using a focusing-cloth in connection with plate-cameras.

With the above and many other objects in view, the invention consists in the novel construction, combination and arrangement of parts shown in the accompanying drawings and which will be hereinafter fully described and defined in the appended claims.

In describing the invention in detail, reference will be had to the accompanying drawings forming a part of this application, and wherein is shown a practical and preferable embodiment of the invention as the same has been practiced by me, and wherein:—

Figure 1 is a rear elevation of a camera with the plate-holding attachment secured thereto with the plate and its holder in position to be projected into the camera when the focus has been obtained, and also showing the focusing hood swung into position over the ground glass, Fig. 2 is a horizontal sectional view of the same, Fig. 3 is a rear elevation of the device in position on a camera, the plate and its holder being removed from the plate-holding guide, and the focusing hood omitted, Fig. 4 is a central horizontal sectional view of the same, Fig. 5 is a detail sectional view of a portion of the spring-back of a camera showing a wear-plate which I prefer to attach to the spring-back when using the plate holder guide, and Fig. 6 is a detail view partly in elevation and partly in section of a part of the plate holder guide, showing particularly one of the clips by means of which the plate-holder guide is attached to the camera.

The invention, broadly stated, consists of a detachable guide attached to the side of the camera, and in which guide the plate-holder carrying the exposure-plate is placed so that it is always ready for instant use.

It is well known to the users of plate-cameras, that oftentimes, after the focus has been taken, and particularly when taking a picture of a group of persons, one or more persons in the group will move out of position in the group while the operator is procuring the plate-holder and plate from the carrying case. Also, during high winds, the camera is very liable to be moved by the force of the wind after the focus has been taken, and during the time the operator is procuring the plate-holder and plate to place them in position in the camera. It is also well known to users of plate-cameras that oftentimes, owing to the haste made to procure the plate-holder and place it within the camera after a focus has been obtained, the operator will insert the slide in the holder at an angle, thus "fogging" the plate, and ruining the picture. My invention is designed to obviate and overcome these objections and difficulties, and to support the plate-holder with its plate in such position that it can be instantly pushed from its guide into position in the camera, obviating danger of the camera moving, since the operator is not required to leave the camera at any time during the operation of taking the picture.

The plate-holder guide, in the embodiment of the same herein shown, comprises a frame embodying broadly, an upright or end-bar 10, and two parallel plate-holder guide and supporting arms 11, projecting outwardly at right angles from the ends of the upright or end bar 10, one at each end of the latter. The upper guide-arm 11, is provided at its longitudinal side edges with depending flanges 12, and the lower guide-arm is provided with like flanges, which, however, project upwardly, thus making both of the guide-arms substantially channel-shaped in cross section, in order that the plate holder 14 may be held therein, yet permitted to be slid freely longitudinally of the guide-arms when pushing the same into the camera or removing it therefrom. Obviously, the particular shape of these guide-arms is immaterial, so long as they are suitably grooved or channeled to properly hold the plate-holder, the construction herein shown being a practical one, in that it permits of the frame which constitutes the major portion of the guide-attachment being constructed of sheet metal, and thus produced at a comparatively small cost; where the frame is so constructed, it is desirable to leave sufficient of the material to form strengthening webs 15 between the upright or end-bar 10 and the guide-arms 11.

The guide is preferably constructed so as to be easily and quickly attached to and detached from the camera, and in its attached position be securely held. A practical construction for accomplishing this result embodies the provision of a pair of clips 16 which are fixedly-secured as by means of small screws 17, or other suitable holdfast devices, to the side of the camera box 18 at the rear end of the latter, one near the top of the box, and the other near the bottom thereof. These clips are provided with two lips 19, and 20 respectively, offset from the plane of the body of the clip so as to be spaced a slight distance from the adjacent face of the camera box 18. The lips 20 extend beyond the lips 19, and the space between the said lips and the adjacent face of the camera box receives the ends of the end-bar 10, and, similarly, the spaces between the lips 19 and the adjacent face of the camera-box receive lugs 21 carried by the upper and lower guide-arms 11, at the inner ends thereof. The sliding movement of the guide into the clips is arrested, as soon as the webs 15 strike against the lips 20 of the clips.

When placed in the position above described, the guide is held against movement rearwardly, such as would disengage it from the clips 16, by means of hinged arms or fingers 22 carried by the guide-arms 11. These arms or fingers 22 are preferably hinged to the front flanges 12 of the guide-arms 11 as shown, and their free ends are tapered and extend beyond the inner ends of the guide-arms 11, and into sockets 23 provided therefor in the adjacent edge of the spring-back 24 of the camera. In order that these arms or fingers will not mar the edge of the spring-back 24, I preferably provide wear-plates 25 around the mouth of the sockets 23 and extending over the edge of the spring-back, as clearly shown in Figs. 1, 3 and 5. These arms or fingers 22, as will be noted by reference to Fig. 2 of the drawings, lie at an angle across the path which is traveled by the plate-holder 14 when the latter is being pushed into position within the camera, and they are consequently forcibly engaged by the end-bar of the plate-holder as the latter is forced inwardly. The inward pressure of the plate-holder 14 against these arms or fingers causes them to move the edge of the spring-back engaged thereby outwardly or rearwardly from the camera box so that the inner end of the plate-holder may enter between the spring-back and the box, and be forced into proper position in the camera in front of the ground glass 26 in the usual manner. The plate-holder is withdrawn from the camera in the usual manner, and removed through the outer end of the guide.

The guide is provided adjacent the outer end thereof, with a pivoted brace 26, the ends of which are pivoted in eyes 27 formed by turning back the outer ends of the rear flanges 12 of the arms, this brace besides holding the outer ends of the arms 11 against spreading, constituting a handle by means of which the guide can be conveniently withdrawn from the plate-holder carrying-case. When the guide is attached to the camera, the brace can be swung back out of the way as will be apparent, to give the hand of the operator free room for shoving the plate-holder into position in the camera.

In order that the plate-holder may not accidentally drop out of the guide when placed therein, it is desirable to provide a suitable retaining means for such plate-holder, such means however being of a nature which will not interfere with the insertion of the holder into, or withdrawal of the same from the guide. In practice, I have generally provided the arms 11, on the inner faces thereof with small leaf springs 28 to engage the upper and lower edges of the plate-holder with sufficient friction to hold the latter against movement in the guide without the application of pressure against the holder. Obviously, any other equivalent means to that shown could be employed for this purpose.

The operation of the device, as so far described, will, it is believed, be readily understood by those skilled in the art, and constitutes a complete and operative camera attachment. However, in connection with the attachment above described, I employ a focusing hood connected with the attachment in such a manner as to be swung into and out of position with respect to the ground glass of the camera. Since the specific construction of this focusing hood forms the subject-matter of a separate application, the hood is shown and will be described herein only generally. To put this part of my invention into practice, I provide the guide arms 11 of the plate-holder guide with studs or pins 29, (Fig. 1) and pivotally-connect thereto, the outer ends of arms 30, the inner ends of which are suitably-connected to a hood-carrying frame 31, surrounded by the hood 32, and provided at the outer end with a suitable eye-piece 33. It will be apparent, that when the door 34 in the spring-back 24 is opened so as to expose the ground glass 26, the focusing hood 32 may be swung on its arms 30 into position over the ground glass plate, as clearly shown in Figs. 1 and 2, the frame 31 being of such construction as to fit neatly within the ground glass opening. When it is not desired to use the hood, the same may be swung outwardly on its arms 30 out of the way, and the arms 30 being detachably-connected with the guide-arms 11, may be disconnected therefrom when it is desired to detach the plate-holder guide from the camera in order that both the plate-holder guide and the hood may be packed in the carrying case. The employment of this hood obviates entirely the necessity for a focusing cloth, and, in connection with the guide which provides means for supporting the plate-holder in position where it can be pushed into the camera immediately upon the focus being obtained, enables the operator to make the exposure of the plate within a comparatively short space of time after having obtained the desired focus. Furthermore, the operator is not hindered in any manner, as is the case where a focusing cloth is used, in his manipulation of the mechanism for moving the lens in or out, in obtaining the desired focus.

It will be evident that the guide attachment will occupy comparatively little space in the carrying case, since a plate-holder may be placed within the guide when the latter is packed in the carrying case, and when the guide is afterward attached to the camera, the plate-holder will be within the same ready for use instantly after focusing of the camera. Obviously, the attachment may be used with either tripod or hand cameras.

While I have herein shown and described in detail a practical embodiment of the invention as the same has been practiced by me, yet it will be evident that various changes may be made in the details of the construction, without departing from the general spirit of the invention.

Having fully described my invention, what I claim as new, and desire to secure by Letters Patent is:—

1. In combination with a camera having a spring-back, a plate-holder guide detachably-secured to one side of the camera in position to permit the entry of a plate-holder from the guide into position between the camera and the spring-back.

2. In combination with a camera, and clips secured to one of the side faces of said camera, a plate-holder guide detachably-connected to said clips.

3. A camera attachment, comprising a plate-holder guide adapted to be detachably-connected to a camera and embodying parallel plate-holder guide-arms adapted to receive a plate-holder, and means at the inner ends of said arms for engagement with the spring-back of the camera to move the latter outwardly as the plate-holder is pushed into the camera.

4. A camera attachment comprising a plate-holder guide, and means for detachably-connecting the same to a camera, combined with means carried by said guide and actuated by a plate-holder within the guide for effecting the outward movement of the camera back to permit the entry of the plate-holder into the camera.

5. An attachment for cameras, comprising a plate-holder guide embodying an end-bar, and two parallel guide-arms connected therewith and extending at right angles thereto and adapted to receive a plate-holder, lugs carried by said guide arms at their inner ends, and means carried by the side of the camera to receive said lugs for detachably-connecting said guide to the side of the camera.

6. In combination with a plate camera having a spring-back, a plate-holder guide detachably-connected to the side of the camera to support a plate-holder in position to be inserted into the camera in front of the spring-back, and means actuated by the plate-holder for moving the spring-back outwardly to permit the entry of the plate-holder into the camera.

7. A camera attachment comprising a plate-holder guide embodying an end-bar and two parallel guide-arms connected thereto adapted to receive a plate-holder, means for detachably-connecting the guide with the side of a camera, means for holding the plate-holder against free sliding movement when placed within the guide, and hinged arms carried by said guide arms, as and for the purpose described.

8. A camera attachment, comprising a plate-holder guide embodying a frame adapted to receive a plate-holder therein, means for detachably-connecting said frame to the side of a camera for supporting the plate-holder in position thereon to be inserted into the camera, and hinged arms carried by said guide, as and for the purpose described.

9. The combination with a plate camera having a spring-back, of a guide and support for a plate-holder, said guide and support being attached to the side of the camera for supporting a plate-holder in position for insertion into the camera, and means carried by the guide and support and engaging the spring-back for moving the latter outwardly as the plate-holder is inserted in the camera.

10. In combination with a plate camera having a spring-back, a plate-holder support attached to the side of the camera for supporting a plate-holder in position for insertion into the camera, and means actuated by the plate-holder as it is moved inwardly in said support for moving the spring-back outwardly to permit the entry of the plate-holder into the camera.

11. A camera attachment comprising a plate-holder support and guide, said support and guide comprising a frame to receive a plate-holder slidable therefrom into position in the camera, means for securing said frame to the camera, and hinged arms carried by said frame, as and for the purpose described.

12. A camera attachment comprising a frame constituting a plate-holder guide and support and embodying parallel guide-arms to receive the plate-holder, means to connect the frame to a camera to support the plate-holder in position for insertion into the camera, and a pivoted-brace connecting the outer ends of said guide arms.

13. In combination with a plate camera having a spring-back, means secured to the side thereof for supporting a plate holder in position to be inserted into said camera, and means actuated by a plate-holder for moving the spring-back outwardly as the plate-holder is moved inwardly in said plate-holder supporting means.

14. In combination with a plate camera having a spring-back, means detachably-secured to the side thereof for supporting a plate-holder in position to be inserted into the camera, and means engaged and actuated by the plate-holder for moving the spring-back outwardly to permit entry of the plate-holder into the camera.

15. In combination with a plate camera having a spring-back, means detachably-secured to the camera exteriorly thereof for supporting a plate-holder in position for insertion into the camera, and means actuated by the plate-holder for moving the spring-back outwardly to permit entry of the plate-holder into the camera.

16. In combination with a plate camera having a spring-back provided with a ground glass, a plate-holder guide and support connected to the camera exteriorly thereof for supporting a plate-holder in position for insertion into the camera, means operated by the plate-holder for moving the spring back outwardly, and a focusing hood pivotally-connected to said guide and plate-holder to swing away from the camera or into position over the ground glass thereof.

17. In combination with a plate camera having a spring-back provided with a ground glass, a plate-holder guide and support detachably-connected to the camera exteriorly thereof for supporting a plate-holder in position for insertion into the camera, means operated by the plate-holder for moving the spring-back outwardly, and a focusing hood pivotally connected to said guide and plate-holder to swing away from the camera or into position over the ground glass thereof.

18. In combination with a plate camera having a spring-back provided with a ground glass, a plate-holder guide and support connected to the camera exteriorly thereof for supporting a plate holder in position for insertion into the camera, means actuated by the plate-holder for moving the spring-back outwardly, and a focusing hood pivotally and detachably connected to said guide and support.

19. In combination with a plate camera having a spring-back, a plate-holder guide and support detachably-connected to the camera exteriorly thereof for supporting a plate-holder in position for insertion into the camera, means actuated by the plate-holder for engaging the spring back to move the latter outwardly as the plate-holder is pushed into the camera and a focusing hood carried by said guide and support and movable into and out of operative relation with respect to the ground glass carried by the spring-back of said camera.

In testimony whereof I affix my signature in the presence of two witnesses.

HENRY G. BAUMAN.

Witnesses:
W. L. HUGHES,
THEON GOWDY.